FERDINAND F. MAYER, OF NEW YORK, N. Y.

Letters Patent No. 91,466, dated June 15, 1869.

IMPROVEMENT IN THE MANUFACTURE OF WHITE LEAD.

The Schedule referred to in these Letters Patent and making part of the same.

*To all whom it may concern:*

Be it known that I, FERDINAND F. MAYER, of the city, county, and State of New York, have invented a new and useful Improvement in the Manufacture of White Lead; and I do hereby declare the following to be a full, clear, and exact description thereof, which will enable those skilled in the art to make and use the same.

This invention consists in producing the pyroligneous acid required for corroding lead in the manufacture of white lead, by treating pyroligneous acetates, such as the acetates of lead, of lime, or of soda, with phosphoric acid, or with the salts of phosphoric acid, possessing an acid reaction, and afterwards precipitating the surplus phosphoric acid with iron or lead, forming phosphates which are insoluble in dilute pyroligneous acid, in such a manner that the pyroligneous acid obtained is free from impurities, and that a pure and uncontaminated white lead is obtained.

In carrying out my process, I take the pyroligneous acetates of lead, lime, or of soda, and treat them with phosphoric acid, or with phosphates having an acid reaction, whereby the pyroligneous acid is disengaged and rendered fit for corroding lead in the manufacture of white lead.

The advantage of the use of phosphoric acid in this process over sulphuric or hydrochloric acid is, that the surplus phosphoric acid, remaining mixed with the pyroligneous acid, can be readily disengaged or precipitated by the action of iron or lead, which form phosphates insoluble in dilute pyroligneous acid, and thereby a pyroligneous acid is obtained which will produce a clean and pure white lead, whereas by using sulphuric or hydrochloric acid in the above-named process, it is extremely difficult to obtain an acetic acid of sufficient purity.

When the pyroligneous acid is obtained by my process from the acetates of lime, I obtain, as a residuum, phosphate of lime, which is valuable for manure.

What I claim as new, and desire to secure by Letters Patent, is—

Producing pyroligneous acid for the manufacture of white lead, by treating pyroligneous acetates with phosphoric acid, or phosphates having an acid reaction, substantially as described.

FERDINAND F. MAYER.

Witnesses:
W. HAUFF,
ERNEST F. KASTENHUBER.